S. Z. DE FERRANTI.
TURBINE BLADING MACHINE.
APPLICATION FILED FEB. 24, 1908.
969,260.
Patented Sept. 6, 1910.
2 SHEETS—SHEET 2.
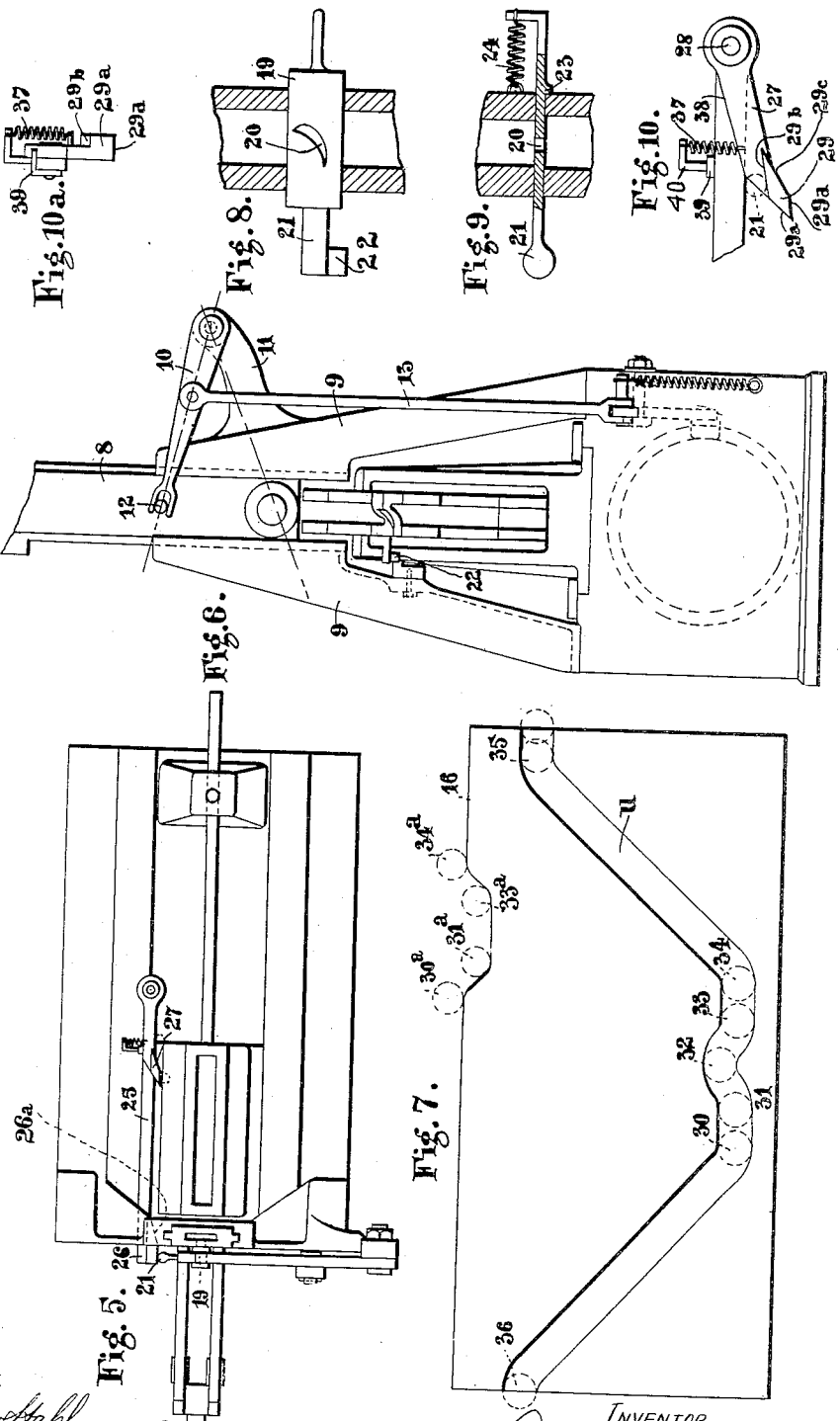
ATTEST.
Bent M. Stahl.
Edward N. Saxton
INVENTOR.
Sebastian Z. de Ferranti,
BY Spear, Middleton, Donaldson & Spear
ATTY'S.

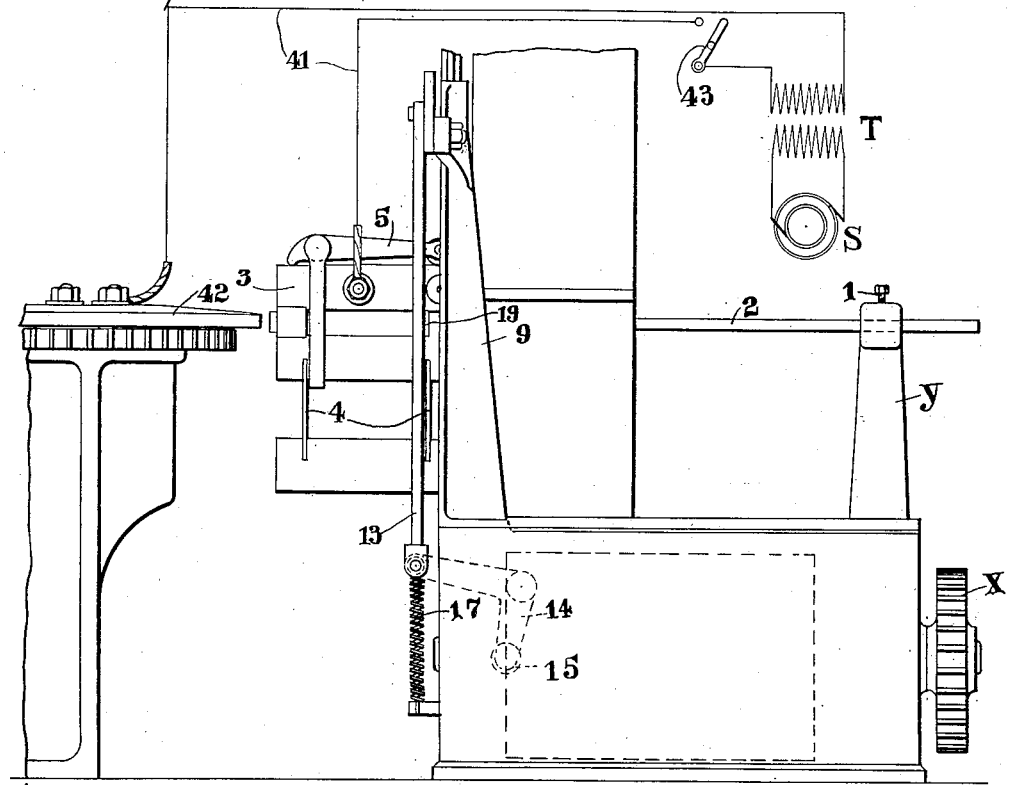

UNITED STATES PATENT OFFICE.

SEBASTIAN ZIANI DE FERRANTI, OF GRINDLEFORD BRIDGE, NEAR SHEFFIELD, ENGLAND.

TURBINE-BLADING MACHINE.

969,260.   Specification of Letters Patent.   Patented Sept. 6, 1910.

Application filed February 24, 1908. Serial No. 417,564.

*To all whom it may concern:*

Be it known that I, SEBASTIAN ZIANI DE FERRANTI, a subject of the King of Great Britain and Ireland, and residing at Grindleford Bridge, near Sheffield, in the county of York, England, have invented certain new and useful Improvements in Turbine-Blading Machines, of which the following is a specification.

The invention relates to the blading of turbines and has special reference to apparatus for welding turbine blades to their carrying elements.

In my U. S. patent specification, No. 874,398, I have described different forms of turbine blade carriers in which the blades are welded in place, the volume of the carrier in the immediate neighborhood of the welding place being adjusted to that of the blades by the formation of holes, grooves or the like in the carrier. In order to provide as smooth a path as possible for the working fluid between the root ends of the blades so welded in place, I propose to thread each blade through a washer prior to the welding operation in order that the holes, grooves or the like in the carrier may be covered and the main object of the present invention is to provide a machine suitable for carrying the operations of washer-threading and blade-welding into effect.

Referring now to the accompanying drawings which form part of my specification, Figure 1 is a part sectional elevation and Fig. 2 is a plan of a blade arrangement in which each blade is threaded through a washer. Fig. 3 shows a part sectional elevation and Fig. 4 shows a side elevation of a machine for automatically threading washers on to blades and welding same to a turbine blade carrier, while Fig. 5 shows a plan and Fig. 6 a front elevation respectively of the same machine. Fig. 7 shows a developed plan of the drum carrying the cam surfaces for reciprocating the welding slide and the washer magazine. Figs. 8 and 9 show detail views of the shutter for the blade magazine. Figs. 10 and 10ª show detail views of the movable stop for operating the shutter shown in Figs. 8 and 9.

In the drawings where desirable, similar parts are denoted by the same reference symbols.

One example of the type of bladed turbine element which my machine is especially adapted to produce is shown in Figs. 1 and 2, in which the blade carrier, $a$, is prepared for welding in accordance with one of the forms shown in my patent specification above referred to by the cutting of circumferential grooves, $b$. A series of washers, $c$, having holes formed to correspond with the shape of the special welding shanks, $e$, of the blades, $d$, are also prepared, one to fit on each blade shank, the ends of these washers being formed as counterparts of each other as seen in Fig. 2, so that when in place they may fit accurately together and form a smooth surface between the root ends of the blades.

The present invention consists in a welding machine adapted to produce bladed turbine elements of the general type above indicated.

In carrying the invention into effect according to one form, as shown in Figs. 3 to 10, a slide, $q$, carrying a magazine, $r$, for blades is mounted on a base, $s$, the slide being reciprocated on the base by means of a roller, $t$, which engages with a cam groove, $u$, formed on the drum, $v$. The drum, $v$, is mounted on the shaft, $w$, which is driven from any convenient source of power by the gear wheel, $x$. A bracket, $y$, is also mounted on the base, $s$, and carries a rod, 2, the position of which in relation to the bracket can be adjusted by means of the pinching screw, 1. The rod, 2, is adapted on the non-welding stroke of the machine to transfer a blade from the magazine, $r$, to the welding jaws, 3. The welding jaws, 3, are resiliently mounted on the slide, $q$, by means of springs, 4, the object of which is to maintain a welding pressure between blade and carrier as the heated parts soften under the influence of the welding current. The jaws are adapted to be clamped by means of the lever, 5, the toe, 6, of which is actuated by the eccentric, 7 and handle 70, operated by hand in any convenient manner so as to force the jaws together at the desired times.

A magazine, 8, for washers is slidably mounted on columns, 9, and is adapted to be reciprocated vertically by means of a forked lever, 10, rotatably mounted on the lug, 11 and engaging with a pin, 12, on the magazine. The lever, 10, is actuated by a connecting rod, 13, which receives its motion from one arm of a bell crank lever, 14, rotatably mounted on the base, $s$. The other arm of the bell crank lever carries a roller, 15, which is caused to follow the contour of a cam surface, 16, formed on the end of the drum, v, by means of the spring, 17. A developed view of the cam groove and surface is shown in Fig. 7 the short sides of the development in their true position meeting in a line parallel to the axis of the drum, v.

The magazine, 8, is provided with an opening, 18, Fig. 3, to allow the entry of the end of a blade which has just been transferred from the magazine, r, to the welding jaws, and the abstraction of a washer when threaded on the blade shank. A shutter 19, Figs. 3, 8 and 9 is slidably mounted in the lower welding jaw at its rearward end and has a hole, 20, pierced therein through which the blades are passed on being transferred from the magazine, r, to the welding jaws. As it is desirable that a stop should be provided for the end of the blade when forcing the washer thereon and when welding I arrange that the shutter shall be actuated so as to close the hole leading from the blade magazine at the correct time and to effect this result the shutter is actuated by a rod, 21, formed as shown in Fig. 8 with a downwardly projecting pin, 22. The shutter is prevented from moving in one direction by the stop, 23, motion in the other direction taking place against the tension in the spring, 24.

A bar, 25, Fig. 5, is rigidly mounted on one of the columns, 9, and carries stops, 26, and 27. The stop, 26, having an inclined face, 26ª, is rigidly secured to the left hand end (see Fig. 5) of the bar, 25, while the stop, 27, is pivotally connected at 28 to its right hand end. The stop, 27, is provided at its free end (see Figs. 10 and 10ª) with a four-sided lateral projection, 29, having faces, 29ª, 29ᵇ, 29ᶜ and 29ᵈ, and is normally held in the position shown in Fig. 5, by a spring, 37, which presses its upper face, 38, against the stop, 39, conveniently formed as a collar on the bracket, 40, to which one end of the spring, 37, is secured.

The welding current is brought to the blade from the transformer, T, by way of the secondary lead, 41, (see Fig. 4) one end of which is connected to the upper jaw, 3, the primary of the transformer being fed from a suitable source of alternating current, S; the other end of the secondary lead, 41, is connected to the turbine element, 42, to which the blade is to be welded, a controlling switch being shown diagrammatically at 43.

The operation of the machine is as follows:—In the position of the machine as shown in Fig. 3, a blade has just been transferred from the blade magazine, r, and deposited between the welding jaws, and the slide, q, now commences to move outward. As the drum, v, is rotated it will be evident from the shape of the cam groove, u, Fig. 7, that the slide is moved forward some little distance and then retracted, and it is during this period that the washer is threaded on to the blade end. When the slide, q, is in the position shown in Fig. 3, the roller, t, is in the position, 30, Fig. 7, while the roller, 15, which reciprocates the washer magazine is in the position, 30ª. The washer magazine will thus be on the point of descending to its lowest position corresponding to the position, 31ª of the roller, 15, in which the discharging orifice of the washer magazine will be directly opposite to the blade retained between the welding jaws. The position of the roller, t, corresponding to this latter position is indicated at 31. The portion, 32, of the groove, u, then causes the slide to be moved forward and threads the blade end through the lowermost washer in which it is a tight fit. During the initial part of this operation the pin, 22, closes the shutter, 19, by contacting with the faces, 29ᶜ and 29ᵈ, of the stop, 27, so that while the washer is being pushed on to one end of the blade the other end butts against the shutter. About the end of this forward movement and when the washer has been pushed on to the blade end the eccentric, 7, is actuated so that the blade is clamped between the jaws. The slide, q, now commences its rearward movement to withdraw the threaded washer from its magazine and when the roller, t, arrives at the position, 33, the roller, 15, will be in the position, 33ª, and on the point of raising the washer magazine which will be raised by the connecting rod, 13, to its highest vertical position when the roller, 15, arrives at the position, 34ª, and the roller, t, at 34. At the end of the rearward movement of the slide, q, the shutter, 19, momentarily opens under the influence of the spring, 24, as the pin, 22, leaves the face, 29ᶜ, but as the drum, v, continues its rotation, the slide, q, is moved forward for the welding operation the shutter, 19, momentarily closing during the early part of this forward movement, as the pin, 22, passes over the faces, 29ᶜ and 29ᵈ, of the stop, 27. Toward the end of the forward movement of the slide, q, the pin, 22, butts against the inclined face, 26ª, of the fixed stop, 26, and closes the shutter, thereby providing an abutment for the rear end of the blade while pressure is exerted by the springs, 4, to make the weld. When the slide, q, arrives at its extreme forward position Fig. 4, the blade end will be in contact with the blade carrier, and the current through the lead, 41, being switched on, the blade will be welded in place. During the welding operation the slide, q, remains stationary the cam groove being arranged so that no movement of the roller, t, takes place when it moves from the position, 35 to 36. The rearward movement of the slide now commences and the eccentric roller, 7, being actuated so as to unclamp the welded blade and the shutter, 19, being opened by the spring, 24, as the pin, 22, passes over the inclined face, 26ª of the stop, 26, the rod, 2, causes a blade to be transferred from the magazine and deposited between the welding jaws. The engagement of the pin, 22, with the faces 29ª, 29ᵇ, of the stop, 27, does not affect the position of the shutter on this stroke as the stop being movable is displaced as shown in Fig. 10, without actuation of the shutter. At the end of the rearward stroke the machine has arrived in the position shown in Fig. 3, when the above cycle of operations is repeated.

Having thus described my invention what I claim as new and desire to secure by Letters Patent is:—

1. In combination, a turbine blade receptacle; blade-holding jaws and means for transferring a blade from said receptacle to said jaws, said means including a slidable member on which said jaws are mounted.

2. In combination, a washer receptacle, blade-holding jaws and means for reciprocating said receptacle and said jaws in paths transverse to one another.

3. In combination, a turbine blade receptacle; having a blade-ejecting aperture therein; a washer receptacle having a washer-extracting aperture therein and means for alining said blade-ejecting and washer-extracting apertures.

4. In combination, a turbine blade receptacle; a washer receptacle and means for moving said receptacles in relation to one another.

5. In combination, a turbine blade receptacle; a washer receptacle and means for reciprocating said receptacles.

6. In combination, blade-holding jaws, and a slidable member on which said jaws are flexibly mounted.

7. In combination, a turbine blade receptacle; blade-holding jaws and a common slide on which said receptacle and said jaws are mounted.

8. In combination, a turbine blade receptacle having an aperture therein; a shutter likewise having an aperture and means for alining said receptacle and said shutter apertures.

9. In combination, blade-holding jaws and a blade-abutment member movably mounted thereon and means for moving said member transversely of said jaws.

10. In combination, blade-holding jaws; an apertured shutter mounted thereon and means for threading a blade through said aperture.

11. In combination, blade-holding jaws; a blade-abutment member slidably mounted thereon and means for moving said member transversely of said jaws.

12. In combination, a framework having vertical and horizontal guides; a turbine blade receptacle movable in one of said guides and a washer receptacle movable in the other of said guides.

13. In combination, a turbine blade receptacle; a washer receptacle and means for reciprocating said receptacles, said means including a cam drum.

14. In combination a washer receptacle; blade-holding jaws; a slide on which said jaws are mounted and means for cyclically reciprocating said jaws, each cycle including an advance toward said receptacle to thread a washer on a blade, a withdrawal of the washered blade and a second advance.

15. In combination, a washer receptacle; blade-holding jaws and cam-operated means to reciprocate said receptacle and said jaws in different paths, said cam-operated means being phased to advance said jaws to thread a washer on a blade, to withdraw said washered blade, to remove said receptacle and to advance said washered blade.

In testimony whereof, I affix my signature in presence of two witnesses.

SEBASTIAN ZIANI DE FERRANTI.

Witnesses:
WALTER ARTHUR EDGAR WOODMAN,
WILLIAM DUNCAN DAVIDSON.